March 19, 1946.  J. H. FRIEDMAN  2,396,995
PROCESS AND APPARATUS FOR MAKING HOLLOW RIVETS
Filed Aug. 3, 1944  2 Sheets-Sheet 1
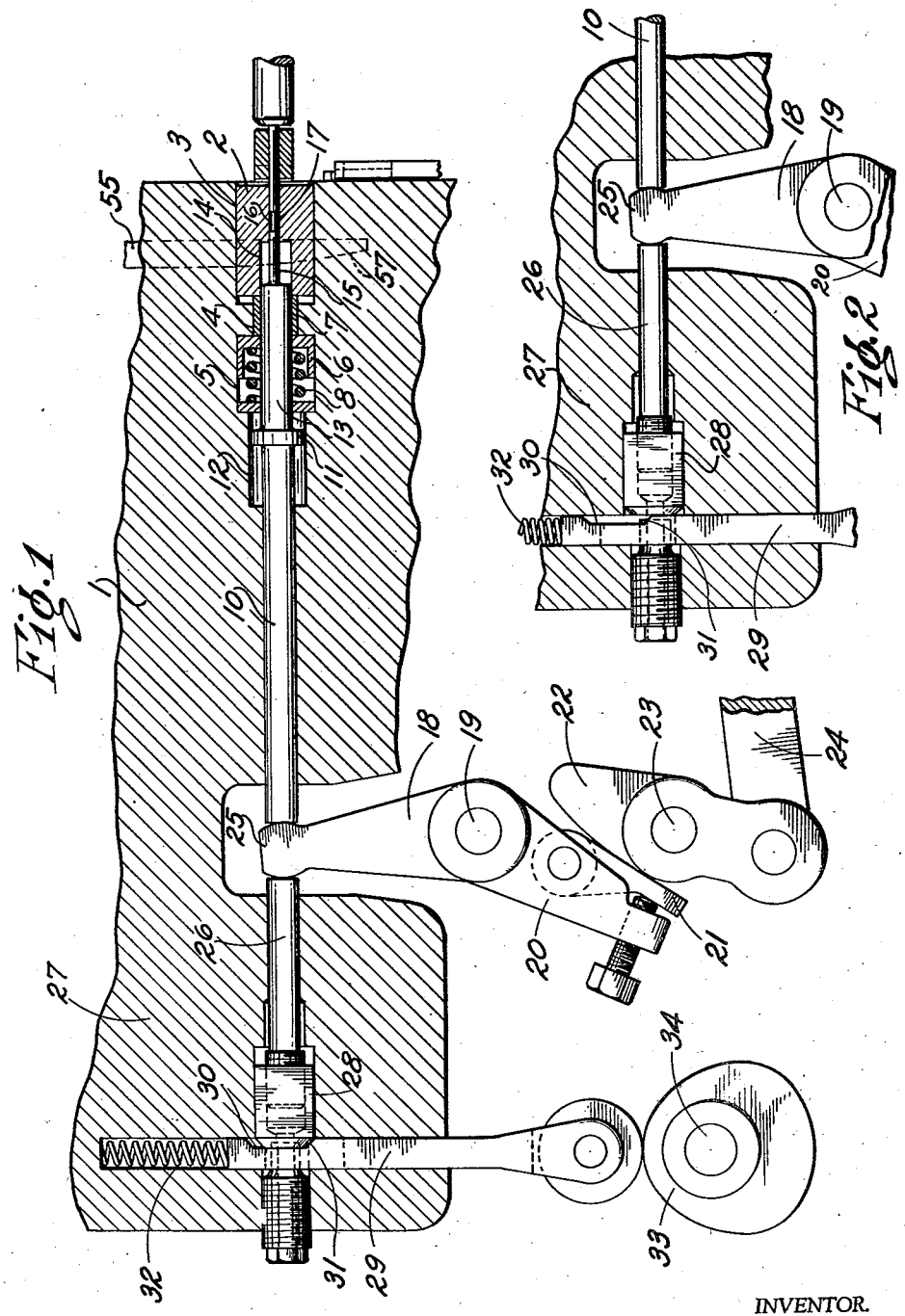
INVENTOR.
JOHN H. FRIEDMAN
BY Richey & Watts
ATTORNEYS

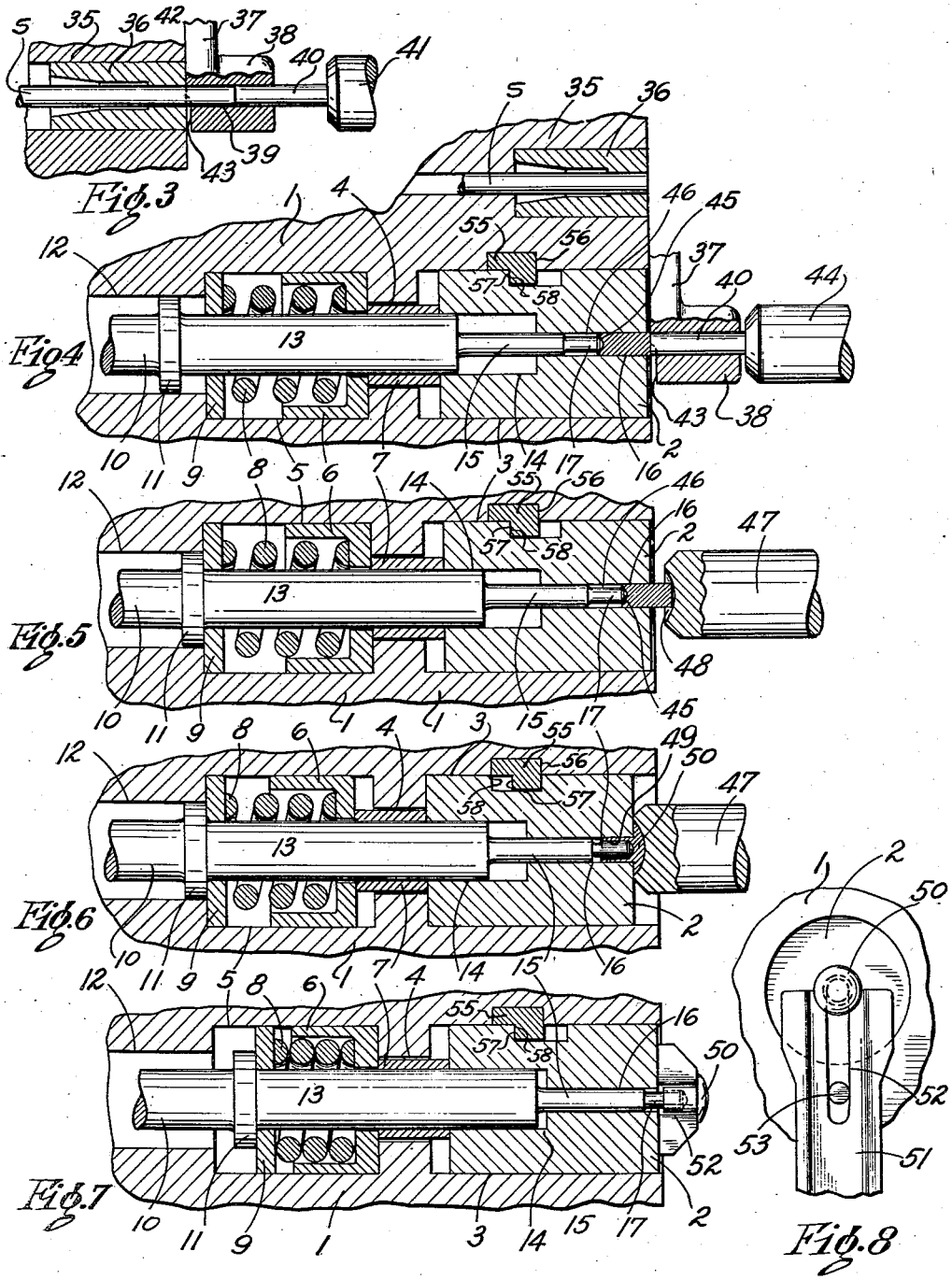

Patented Mar. 19, 1946

2,396,995

UNITED STATES PATENT OFFICE 2,396,995

PROCESS AND APPARATUS FOR MAKING HOLLOW RIVETS

John H. Friedman, Tiffin, Ohio, assignor to The National Machinery Company, Tiffin, Ohio, a corporation of Ohio Application August 3, 1944, Serial No. 547,886

22 Claims. (Cl. 10—12)

This invention relates to the manufacture of metal articles by cold heading and more particularly to a process and apparatus for making headed rivets with hollow shanks from wire or rod stock.

One object of this invention is to increase the life of the tools and dies for making hollow rivets and the like, and increase the accuracy and uniformity of the articles, by directing the pressures and the metal flow so as to minimize the concentration of pressure on all parts of the tools and dies and the blanks, and by preventing any concentration of pressures which might cause erosion or scoring of the dies and tools. Other objects are to improve the accuracy and uniformity of hollow rivets and the like, and to permit the manufacture of such articles with extremely short shanks, by sizing the cut-off blank before subjecting the same to the upsetting operations; to minimize the pressures required for forming the articles by causing an endwise upsetting pressure on the blank to pull or telescope the blank over a piercing tool; with the metal displaced from the shank either flowing into an upset or extruding along the piercing tool, or both; and to improve the apparatus for cutting off and carrying over blanks, and the knockout and shank piercing apparatus. Other objects will appear from the following description of a preferred embodiment of my process and apparatus.

In the accompanying drawings:

Fig. 1 is a longitudinal section through a double blow header equipped with a die and knockout and piercing mechanism in accordance with this invention;

Fig. 2 is a detail sectional view showing the knockout and piercer actuating mechanism in a different position;

Fig. 3 is a detail horizontal section through the stock feeding station and cut-off arm;

Fig. 4 is a horizontal section through the die and stock feeding station and showing the punch at the end of the first stroke of the machine;

Fig. 5 is a horizontal section through the die showing the parts at the beginning of the second blow;

Fig. 6 is a similar view showing the parts at the completion of the second blow;

Fig. 7 is a similar view showing a completed blank being ejected from the machine into a stripper in accordance with this invention; and Fig. 8 is a front elevation of the die and stripper in the position shown in Fig. 7.

I prefer to carry out my novel process on a conventional double blow header with suitable modifications in the cut-off and knockout mechanism. Such a machine embodies a bed frame 1, carrying a die and a stock feeding station, on which is mounted a reciprocating header slide carrying a pair of punches, each of which is aligned with the die in the bed frame on alternate strokes of the slide. In such a machine a suitable cut-off mechanism is provided to cut off and carry over a new blank after every other stroke, and similarly suitable ejecting or knockout mechanism is provided to eject the finished article from the die after every two strokes of the header slide.

In accordance with one embodiment of the present invention a die 2 is slidably positioned in a bore 3 in the bed frame 1. Behind and in alignment with the bore 3 the bed frame is provided in any suitable manner with a smaller bore 4 opening into an enlarged bore 5. A follower including a cup portion 6 slidably fitting in the bore 5 and a sleeve 7 slidably fitting in the bore 4 is arranged to engage the rear end of the die 2. A spring 8 is positioned in the bore 5 bearing against the cup portion 6 and against a follower plate 9 which is also slidably fitted in the bore 5.

A knockout rod 10 is slidably supported in the frame coaxial with the die 2 and is provided intermediate its length with a flange 11 slidably bearing in a bore 12 behind and communicating with the bore 5. Ahead of the flange 11 the knockout rod includes a length 13 which passes through central apertures in the follower plate 9, the cup 6, and the sleeve 7, and enters a bore 14 in the die 2. A relatively small extension 15 is carried by the forward end of the knockout rod and slidably fits in the working bore 16 of the die. The extension 15 terminates in a piercing tool 17.

The forward sliding movement of the die 2 is adjustably limited in any suitable way, as by the vertically slidable wedge 55 guided in a slot 56 in the bed frame and having a rearwardly facing wedge surface 57 cooperating with wedge surface 58 formed on the die.

With this arrangement the die 2 is normally held pushed forward in its bore 3 by the tension of the spring 8, with the wedge surfaces 57 and 58 in contact, while the die can be forced rearwardly a short distance by further compression of the spring 8. The spring 8 likewise acts as a return spring for the knockout rod 10 when the same is advanced sufficiently to cause the flange 11 to engage the follower plate 9 and compress the spring from the rear end.

A lever 18 is arranged to actuate the knockout rod 10 for ejecting a finished blank from the die. The lever 18 is pivoted to the frame at 19 and has an integral arm 20 carrying a pivoted and adjustable toe plate 21. A cam 22 pivoted to the frame at 23 is arranged to engage the toe plate 21 and force the lever 18 forwardly. The cam 22 is actuated by a connecting rod 24 which may be driven from a suitable cam rotating at half the speed of the crankshaft, as is customary in machines of this type. The upper end of the lever 18 is formed with a ball head 25, one side of which engages the rear end of the knockout 10, and the other side of which engages a supplemental push rod 26 mounted in an extension 27 of the bed frame.

The push rod 26 is connected to a head 28 slidable in an opening in the bed frame extension 27, and engaging a vertically slidable rod 29. The rod 29 is formed on its forward face with a cam recess 30 shaped to receive the end of the head 28 in one position of the rod 29 and having an inclined lower edge 31 cooperating with a similarly shaped surface on the head 28 to cam the head 28 and push rod forwardly when the rod 29 is moved upwardly. The rod 29 is normally held in its lower position by a spring 32 engaging the upper end thereof, and is arranged to be lifted once every two revolutions of the crankshaft by a cam 33 mounted on a shaft 34 driven at half speed from the crankshaft in any suitable manner.

When the rod 29 is lifted by the cam 33 the parts occupy the position shown in Fig. 2. The upward movement of the rod 29 forces the head 28 to the right, as seen in Figs. 1 and 2, so that the rod 26 pushes the head 25 of the lever 18 forwardly, moving the arm 20 away from the cam 22 and moving the ejector rod 10 and its associated elements forwardly in the die.

Rod or wire stock S is fed to the machine through a feeding aperture 35 in the bed frame arranged a short distance to one side of the die 2. The feeding aperture is provided at its forward face with a shear bush or die 36 with which cooperates a reciprocating cut-off arm 37. The cut-off arm 37 carries a shearing quill 38 having a central aperture 39 which, in the retracted position of the arm as illustrated in Fig. 3, is aligned with the opening in the bushing 36. A short plunger 40 is slidably mounted in the opening 39 of the shearing quill. A stock gauge 41 is also aligned with the feed opening in the bushing 36 and is arranged to abut the plunger 40 to limit the length of stock fed into the shearing quill 38, as shown in Fig. 3.

The face of the quill 38 adjacent the bushing 36 is formed with a cutting edge 42 arranged to lie closely adjacent the face of the bushing 36. On the opposite side the quill 38 is recessed or relieved as indicated at 43 to insure against interference with the end of the blank when the cut-off arm 37 is retracted.

The arm 37 is reciprocated or oscillated in any suitable manner so as to cut off a blank and carry the same into alignment with the aperture 16 in the die 2 once every two revolutions of the crankshaft. After a length of stock has been fed into the quill 38 until the plunger 40 contacts the stock gauge 41, as shown in Fig. 3, the cut-off arm 37 is advanced to the position shown in Fig. 4. The shearing edge 42 severs the wire at the face of the bushing 36 and the quill 38 carries the blank so cut off and the plunger 40 into alignment with the opening 16 in the die 2. The cut-off arm is timed to dwell in alignment with the die during the first stroke of the header slide, at which time a punch 44 is advanced against the plunger 40 as illustrated in Fig. 4. At this time the vertically movable rod 29 is in its lower position, as shown in Fig. 1, so that the ejector rod 10 and the piercer 17 are in their rearmost positions. The punch 44 continues to advance and slides the plunger 40 through the quill 38 and pushes the cut off blank into the opening 16 in the die 2 and against the end of the piercer 17.

As shown in Figs. 4, 5, 6 and 7, the forward end of the piercer 17 is formed with a substantially conical point 45 for engagement with the end of the blank, and for the greater part of its length the piercer is relieved or reduced to a diameter less than the maximum diameter of the conical point 45, as indicated at 46. The length of the cut off blank is so proportioned with respect to the position of the piercer 17 in the die and the movement of the punch 44 that at the end of the forward movement of the punch 44 the cut off blank is pressed against the conical point 45 of the piercer and is upset slightly into full engagement with the wall of the opening 16 in the die. Preferably at the completion of this stroke the blank projects slightly from the face of the die as indicated in Fig. 4. The recess or relief 43 on the shearing quill 38 is of greater depth than the amount which the blank projects from the die at the completion of the first blow so that the cut-off arm 37 can be retracted without interference with the blank.

After the completion of the first heading stroke by the punch 44, the heading slide recedes and the cut-off arm is retracted into alignment with the shearing bush 36 ready to receive a new length of stock. Thereafter, and before the heading slide has completed its next forward stroke, the cam 33 lifts the vertically reciprocable rod 29 into the position shown in Fig. 2 so that the ejector rod 10 is advanced in the die an amount equal to the depth of the cam recess 30 in the rod 29. This movement causes the piercer 17 to advance to the position shown in Fig. 5, sliding the cut off blank through the opening 16 in the die so that a greater portion of it projects from the face of the die, as shown in Fig. 5.

On the next stroke of the header slide the punch 44 is moved out of alignment with the die and a punch 47 is moved into alignment with the die and the cut off blank. The punch 47 is formed on its forward face with a heading recess 48 having the shape which it is desired to impart to the head of the rivet. When the punch 47 first contacts the free end of the blank projecting from the die 2 the parts occupy the position shown in Fig. 5. Further forward movement of the punch 47 exerts an axial force upon the cut off blank tending to upset the free end into a head and simultaneously tending to push the opposite end of the blank over the conical point 45 in the piercer 17.

The blank is thus subjected to endwise pressure between the punch 47 and the point of the piercer tool 17. The initial tendency of such pressure is to expand the blank radially throughout its length with a corresponding reduction in length. The portion of the blank confined within the die opening 16 is immediately swelled into tight gripping engagement with the wall of the die opening.

The portion of the blank projecting from the front face of the die and engaging the punch 47 being unconfined laterally starts to swell or mushroom between the punch 47 and the face of the die. Rearward movement of the die and blank as a unit to escape the heading pressure is resisted only by the tension of the spring 8 and the engagement of the point of the piercer 17 with the rear end of the blank. As the projecting portion of the blank mushrooms, the force required to continue the metal flow increases until it exceeds the resistance of the metal to penetration by the piercer 17, when the die starts to move rearwardly compressing the spring 8 and stripping or pulling the blank over the point of the piercing tool 17. This action is free to start without sliding or extruding the exterior surface of the blank along the wall of the die opening 16 since the friction of the blank against the die opening simply carries the die rearwardly with the blank against the tension of the spring 8. No forces are exerted tending to slide or extrude the blank within the the die opening during the beginning of the piercing operation since the forces are exerted on the blank by the punch 47 and the piercing tool 17, the die being simply carried along by the movement of the exterior surface of the blank which has been swelled into tight gripping engagement with the wall of the die opening.

During the flowing of the metal of the blank under the pressure of the punch 47 the blank may extrude somewhat along the wall of the die opening 16. However this flow does not abrade or exert excessive pressures against the wall of the die opening because after the piercer has been started into the blank the metal flow continues with less pressure than that required to start the flow. Some metal may flow axially through the blank into the heading space, and any desired combination of axial flow forwardly into the heading space and extrusion rearwardly into the die may be employed.

At the completion of the forward stroke of the punch 47 the parts are in the position shown in Fig. 6. The piercer 17 has entered the blank to form a hollow shank 49 and the forward end of the blank has been upset into a head 50. The die has been moved rearwardly against the force of the spring 8 and is bottomed in the recess 3 at the completion of the stroke.

Thereafter the header slide again recedes and the cam 22 is actuated to move the ejector rod 10 forwardly. The shoulder 11 on the rod 10 engages the follower plate 9 and compresses the spring 8 forwardly in the recess 5 as shown in Fig. 7. Normally the rivet remains tightly gripped on the piercer 17 as the punch 47 recedes so that the die 2 is permitted to return to its forward position as the ejector rod 10 moves forwardly. As the motion of the ejecting rod continues a stripper 51, slidably mounted on the frame in position to engage the face of the die 2 in its forward position, moves upwardly. When the die 2 has reached the forward limit of its movement, continued movement of the ejector rod moves the blank carried on the piercer 17 out of the die opening 16 into the position illustrated in Fig. 7. The stripper plate 51 then moves upwardly behind the underface of the head 50 of the completed rivet, the shank 49 entering the slot 52 formed in the stripper plate. The cam 22 then permits the ejector rod 10 to move rearwardly under the influence of the spring 8 stripping the piercer 17 from the shank of the completed rivet and leaving the rivet in the slot 52 of the stripper plate 51. The stripper plate 51 then moves downwardly and if the completed rivet remains in the slot 52 it is knocked out by contact with a pin 53 secured in the frame of the machine and projecting into the slot 52 as shown in Fig. 8. As soon as the stripper plate 51 has moved downwardly out of the way the shear arm 37 carries a new blank into alignment with the die and the operations are repeated.

In its broader aspects the novel piercing operation of the present invention is not limited to the character of the heading punch which forces the die 2 and the blank positioned therein rearwardly over the piercing tool 17, nor to the shape of the cavity in the heading punch. For example, the heading punch employed in this operation may be a coning tool to simply swell the portion of the blank projecting from the die 2 into a cone or preliminary upset of any desired shape. Similarly, in certain embodiments the heading tool may be arranged to contact the face of the die 2 and start the rearward movement of the die with respect to the piercing tool 17 before the blank contacts the bottom of the recess in the heading tool so that the rearward movement of the die and the blank is started before endwise pressure is exerted on the blank.

This application is a continuation in part of my copending application Serial No. 423,900, filed December 22, 1941.

Although preferred embodiments of my invention have been described in considerable detail it will be understood that many variations and modifications may be resorted to without departing from the scope of the invention as defined in the following claims.

I claim:

1. The process of making hollow rivets comprising shearing a blank from elongated stock, confining one end of the blank in a die opening with the other end projecting from the face of the die, and exerting endwise pressure upon the blank by a piercing tool in the die opening and a heading punch engaging the projecting end of the blank and spaced from the face of the die to pierce the shank and simultaneously upset the projecting end of the blank.

2. The process of making hollow rivets comprising shearing a blank from elongated stock, confining a portion of the blank in a die opening in engagement with a piercing tool disposed within the die opening, moving a heading punch into engagement with the projecting end of the blank, and continuing such movement to upset the projecting end of the blank laterally and to push the opposite end of the blank over the piercing tool.

3. The method of making hollow rivets compising shearing a blank from elongated stock, confining a portion of the length of the blank in the opening of an axially floating die, exerting pressure on the opposite ends of the blank by opposed pressure elements comprising a piercing tool disposed within the die opening and a heading punch engaging the projecting end of the blank, holding one of said pressure elements stationary and moving the other toward the same to push the blank over the piercing tool and simultaneously upset the projecting end of the blank without exerting axial pressure on said die by said pressure elements during the first portion of such movement, so that said die is free to move axially with the exterior surface of the portion of the blank confined therein.

4. The method of making hollow rivets comprising shearing a blank from elongated stock, confining a portion of the length of the blank in the opening of an axially floating die in engagement with a piercing tool disposed within the die opening, holding said piercing tool stationary and moving a heading punch into engagement with the projecting end of the blank to push the blank over the piercing tool and to upset the projecting end of the blank.

5. The method of making hollow rivets comprising shearing a blank from elongated stock, confining a portion of the length of the blank in the opening of an axially floating die in engagement with a piercing tool disposed within the die opening, holding said piercing tool stationary and moving a heading punch into engagement with the projecting end of the blank to push the blank over the piercing tool and to upset the projecting end of the blank, without engaging said die directly by said heading punch during the first portion of such movement, so that said die is free for limited axial movement with the exterior surface of the portion of the blank confined therein.

6. The process of making hollow rivets comprising shearing a blank from elongated stock, pushing the blank into a die opening, exerting pressure on the opposite ends of the blank by a piercing tool within the die and a first heading punch to expand the blank into close fitting engagement with the wall of the die opening, retracting the first heading punch, moving the piercing tool axially with respect to the die to project a portion of the blank from the die, and striking the projecting end of the blank with a second heading punch to pierce the shank of the blank and upset a head on the projecting end thereof.

7. The process of making hollow rivets comprising shearing a blank from elongated stock, pushing the blank into an opening in an axially floating die, exerting pressure on the opposite ends of the blank by a piercing tool within the die and a first heading punch to expand the blank into close fitting engagement with the wall of the die opening, retracting the first heading punch, moving the piercing tool axially with respect to the die to project a portion of the blank from the die, striking the projecting end of the blank with a second heading punch while holding the piercing tool stationary, pushing the blank over the piercing tool while permitting the die to move axially with the exterior surface of the blank, and completing the formation of a head on the projecting end of the blank while holding the die stationary.

8. A double blow header for making hollow rivets including a bed frame carrying a die mounted for limited axial sliding movement, a knockout rod slidably mounted co-axially with said die, and terminating in a piercing tool arranged to act upon blanks supported in said die, cam means for advancing said knockout rod and piercing tool in said die between the first and second blows of said header, and for advancing said knockout rod to eject blanks from said die after the second blow of said header.

9. A double blow header for making hollow rivets including a bed frame carrying a die, a knockout rod arranged co-axially with the die and terminating in a piercing tool arranged to act upon a blank supported in the die, and cam means arranged to hold said knockout rod stationary during the first blow of said header, to advance said knockout and piercing tool in the die between the first and second blows, to hold said knockout rod stationary during the second blow, and to advance the same to eject a blank from said die after the second blow.

10. A double blow header for making hollow rivets including a bed frame carrying a die mounted for limited axial sliding movement, a knockout rod arranged co-axially with the die and terminating in a piercing tool arranged to act upon a blank supported in the die, and cam means arranged to hold said knockout rod stationary during the first blow of said header, to advance said knockout and piercing tool in the die between the first and second blows, to hold said knockout rod stationary during the second blow, and to advance the same to eject a blank from said die after the second blow.

11. A header comprising a die having a bore to receive a length of stock, means for upsetting said stock to form a head, knockout means slidably disposed within the bore of said die arranged to be moved to eject the headed member from the die, a stripper slidably mounted along the face of the die, said stripper having a slot of sufficient width to receive the shank of the headed article but narrower than the diameter of the head thereof and being arranged to be moved to straddle the shank of the ejected article to free the same from said ejector, and a stationary pin disposed in the slot of said stripper arranged to engage the headed article and knock the same from the stripper when the stripper is retracted from the die.

12. A header for making hollow rivets comprising a die having a bore to receive a length of stock, means for upsetting said stock to form a head, a piercing tool slidably disposed within the bore of said die arranged to pierce the blank and to be moved to eject the rivet from the die, a stripper slidably mounted along the face of the die, said stripper having a slot of sufficient width to receive the shank of the rivet but narrower than the diameter of the head thereof and being arranged to be moved to straddle the shank of the rivet and to free the same from said piercing tool and a stationary pin disposed in the slot of said stripper arranged to engage the rivet and knock the same from the stripper.

13. Apparatus for making hollow rivets comprising a frame carrying an axially floating die and a reciprocating header slide, means for feeding elongated stock, shear means for cutting off blanks from said stock and carrying the same into alignment with said die, a piercing tool projecting into said die, a pair of punches carried by said header slide, means for moving said punches to align each punch with said die on alternate strokes of said header slide, one of said punches being arranged to force a blank from said shear means into said die and against said piercing tool, and the other of said punches being arranged to upset the end of the blank and simultaneously force the blank over said piercing tool.

14. Apparatus for making tubular rivets comprising a bed frame, a heading slide reciprocably mounted in said bed frame, a die mounted in said bed frame for limited axial sliding movement, said die having an axially extending opening of uniform diameter, a piercing tool slidably supported in said bed frame behind said die and having a portion extending into and spaced from the wall of said axial opening, transfer mechanism for moving blanks into alignment with said die, means for backing up said piercing tool to hold the same stationary during the piercing operation, and a tool on said header slide arranged to force said die and a blank positioned in the axial opening in said die toward said piercing tool to telescope the blank over said piercing tool and form a tubular portion thereon.

15. Apparatus for making tubular rivets comprising a bed frame, a heading slide reciprocably mounted in said bed frame, a die mounted in said bed frame for limited axial sliding movement, said die having an axially extending opening, a piercing tool slidably supported in said bed frame behind said die and having a portion extending into and spaced from the wall of said axial opening, said piercing tool having a piercing head at its end and a relieved portion behind said head, transfer mechanism for moving blanks into alignment with said die, means for backing up said piercing tool to hold the same stationary during the piercing operation, and a tool on said header slide arranged to force said die and a blank positioned in the axial opening in said die rearwardly with respect to said piercing tool to telescope the blank over said piercing tool and form a tubular portion thereon.

16. Apparatus for making tubular rivets comprising a bed frame, a heading slide reciprocably mounted in said bed frame, a die mounted in said bed frame for limited axial sliding movement, said die having an axially extending opening of uniform diameter, a piercing tool slidably supported in said bed frame behind said die and having a portion extending into and spaced from the wall of said axial opening, said piercing tool having a piercing head at its end and a relieved portion behind said head, transfer mechanism for moving blanks into alignment with said die, means for backing up said piercing tool to hold the same stationary during the piercing operation, and a tool on said header slide arranged to force said die and a blank positioned in the axial opening in said die rearwardly with respect to said piercing tool to telescope the blank over said piercing tool and form a tubular portion thereon.

17. The process of making tubular rivets and the like comprising supporting a blank in a bore of uniform cross section formed in an axially movable die, engaging the blank with the end of a piercing tool extending into the die, holding said piercing tool stationary and forcing said die and the blank supported therein toward said piercing tool to telescope the blank over said piercing tool and form a tubular portion thereon.

18. The process of making tubular rivets and the like comprising supporting a blank in a bore of uniform cross section formed in an axially movable die, engaging the blank with the end of a piercing tool having a working end portion and a relieved shank portion, holding said piercing tool stationary and forcing said die and the blank supported therein toward said piercing tool to telescope the blank over said piercing tool and form a tubular portion thereon.

19. The process of making tubular rivets and the like, comprising supporting a blank in a bore of uniform cross section formed in an axially movable die engaging one end of the blank with a piercing tool extending into the die, holding said piercing tool stationary and forcing said die and the blank supported therein toward said piercing tool by means of a punch having a cavity receiving the other end of the blank so as to telescope the blank over said piercing tool and form a tubular portion of uniform cross section thereon and simultaneously upset the other end of said blank into said cavity.

20. The process of making tubular rivets and the like, comprising supporting a blank in a bore of uniform cross section formed in an axially movable die engaging one end of the blank with a piercing tool extending into the die having a working end portion and a relieved shank portion, holding said piercing tool stationary and forcing said die and the blank supported therein toward said piercing tool by means of a punch having a cavity receiving the other end of the blank so as to telescope the blank over said piercing tool and form a tubular portion of uniform cross section thereon and simultaneously upset the other end of said blank into said cavity.

21. The method of making hollow rivets comprising shearing a blank from elongated stock, confining a portion of the length of the blank in the opening of an axially floating die, exerting pressure on the opposite ends of the blank by opposed pressure elements comprising a piercing tool disposed within the die opening and a heading punch engaging the projecting end of the blank, holding one of said pressure elements stationary and moving the other toward the same to push the blank over the piercing tool and simultaneously upset the projecting end of the blank, so that said die is free to move axially with the exterior surface of the portion of the blank confined therein.

22. The method of making hollow rivets comprising shearing a blank from elongated stock, confining a portion of the length of the blank in an opening of uniform cross section formed in an axially floating die, exerting pressure on the opposite ends of the blank by opposed pressure elements comprising a piercing tool disposed within the die opening and a heading punch engaging the projecting end of the blank, holding one of said pressure elements stationary and moving the other toward the same to push the blank over the piercing tool and simultaneously upset the projecting end of the blank, so that said die is free to move axially with the exterior surface of the portion of the blank confined therein.

JOHN H. FRIEDMAN.